(12) United States Patent
Chin-Feng

(10) Patent No.: US 6,398,678 B1
(45) Date of Patent: Jun. 4, 2002

(54) SPEED ADJUSTING DEVICE FOR A DRILL

(76) Inventor: Wang Chin-Feng, 11F-2, No. 43, Chai-I Street., Taichung City (TW)

(*) Notice: Subject to any disclaimer, the term of this patent is extended or adjusted under 35 U.S.C. 154(b) by 0 days.

(21) Appl. No.: 09/596,801

(22) Filed: Jun. 19, 2000

(51) Int. Cl.[7] .................. F16H 59/00; F16H 61/00; F16H 63/00; F16H 9/18; B23B 45/10

(52) U.S. Cl. ................. 474/29; 474/30; 474/35; 408/128

(58) Field of Search ............... 474/29, 30, 32, 474/35

(56) References Cited

U.S. PATENT DOCUMENTS 3,146,628 A * 9/1964 Diehl et al. .............. 474/29
3,608,386 A * 9/1971 Pambid et al. ............ 474/29
3,718,405 A * 2/1973 Keiter et al. ............. 408/128

* cited by examiner

Primary Examiner—Sherry Estremsky
Assistant Examiner—Tisha D. Lewis
(74) Attorney, Agent, or Firm—Charles E. Baxley

(57) ABSTRACT

A speed adjusting device for a drill includes two pulley assemblies between which a belt is connected. Each pulley assembly has a fixed disk and a movable disk so that an effective diameter that the belt engages the pulley assembly can be changed by adjusting a distance between the disks. One of the pulley assembly driven by a motor shaft has a spring which is biased between the movable disk and a motor. A pressing member presses the movable disk of the other pulley assembly which is connected to an output shaft. A lifting device can be operated to adjust the pressing member to allow the spring to change the distance between the other pulley assembly so as to obtain different effective diameter in each pulley assembly.

6 Claims, 4 Drawing Sheets

SPEED ADJUSTING DEVICE FOR A DRILL

FIELD OF THE INVENTION

The present invention relates to a speed adjusting device for a drill wherein the output shaft is connected to a first pulley which is connected with a second pulley by a belt. Each pulley is composed of two disks which are respectively retained by two respective retaining means. The two disks can be separated from or moved toward each other to change an effective radius of the belt so as to adjust a speed of the output speed.

BACKGROUND OF THE INVENTION

A conventional power transmission system for a drill is shown in FIG. 1 and generally includes a motor 10 having a shaft 11 which extends into a box and is securely connected to a first set of gears 12 which includes a plurality of grooves with different diameters. A second set of gears 13 is located in the box and has a plurality of grooves with different diameters. The second set of gears 13 is connected to an output shaft 14 and a drill clamping device 140 is connected to the output shaft 14 so that a drill bit is connected to the drill clamping device 140. A belt 15 is engaged with the two respective grooves in the two set of gears so that when the motor 10 is actuated, the second set of gears 13 is rotated by the belt 15 so as to let the drill bit drill into an object. In such a power transmission, the output shaft 14 can only rotate at a fixed speed because the position of the belt 15 is secured. When the speed of the output shaft 14 needs to be changed such as when the object to be drilled is different, the users have to stop the motor 10 completely and then removes the belt 15 from one groove to another so as to obtain a different effective diameter on the gears to change the rotational speed of the output shaft. It takes time and break the consistency of working.

The present invention intends to provide a speed adjusting device for a drill and the speed can be easily changed without stopping the motor and simply by rotating a wheel on outside of the drill.

SUMMARY OF THE INVENTION

In accordance with one aspect of the present invention, there is provided a speed adjusting device for a drill and comprising a first pulley assembly movably mounted to a motor shaft and the first pulley assembly comprising a first fixed disk and a first movable disk. The first fixed disk is fixedly connected to the motor shaft and the first movable disk is movably mounted to the motor shaft. Each of the first fixed disk and the first movable disk has an inclined surface facing each other. A spring is biased between the first movable disk and the motor. A second pulley assembly comprises a second fixed disk and a second movable disk. The second fixed disk is fixedly mounted to a driving shaft and the second movable disk is movably mounted to the driving shaft. Each of second fixed disk and the second movable disk has an inclined surface facing each other. An output shaft is connected to the driving shaft. A belt is movably engaged between the first fixed disk and the first movable disk, and between the second fixed disk and the second movable disk. A pressing member has a first pivotally connected a frame and a second end of the pressing member presses on the second movable disk. A lifting means is connected to the pressing member.

The object of the present invention is to provide a speed adjusting device for a drill wherein the motor is running while changing the speed of the output shaft.

Another object of the present invention is to provide a speed adjusting device for a drill wherein the speed can be changed by rotating a wheel.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
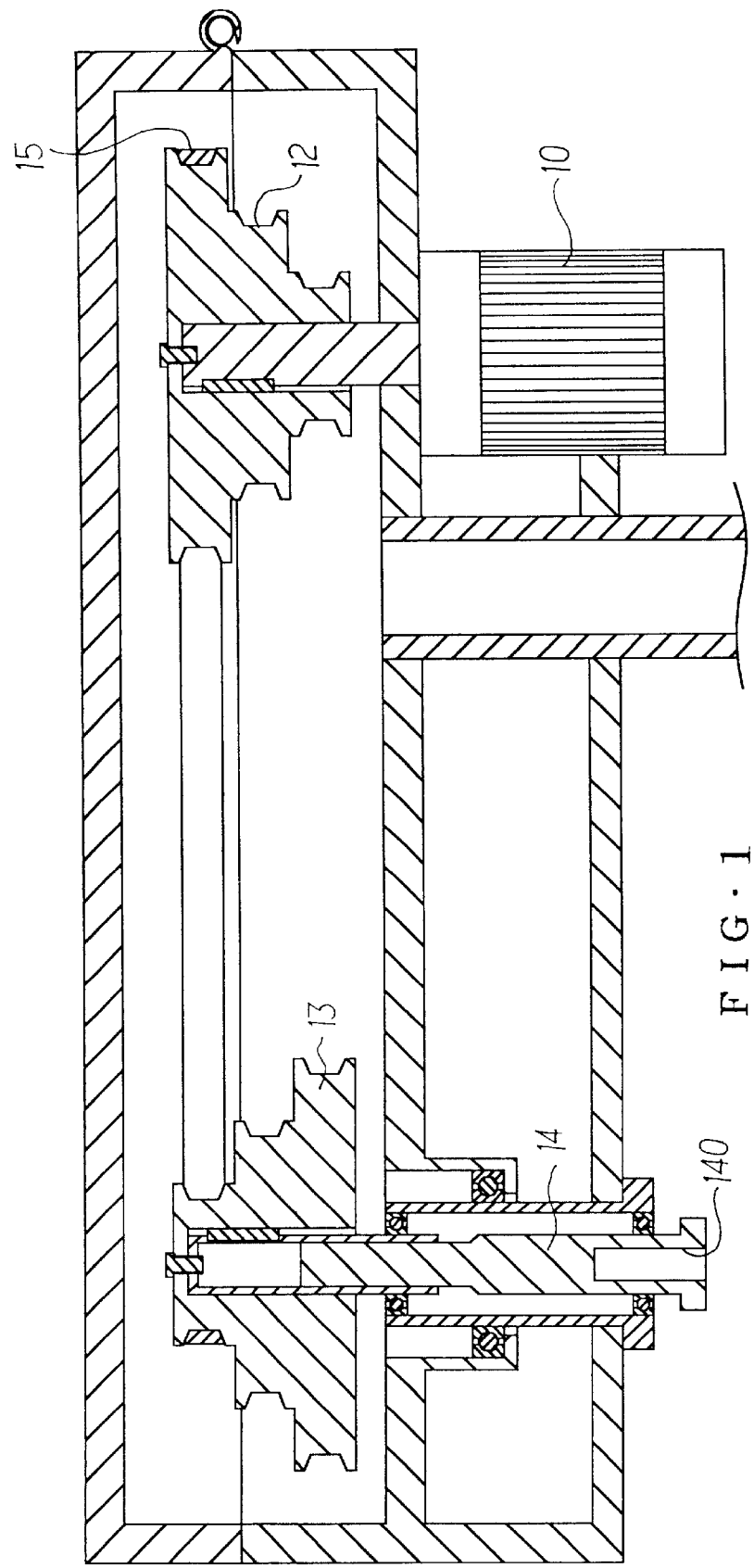
FIG. 1 is a cross sectional view to show a conventional speed transmission device.
Figure 2:
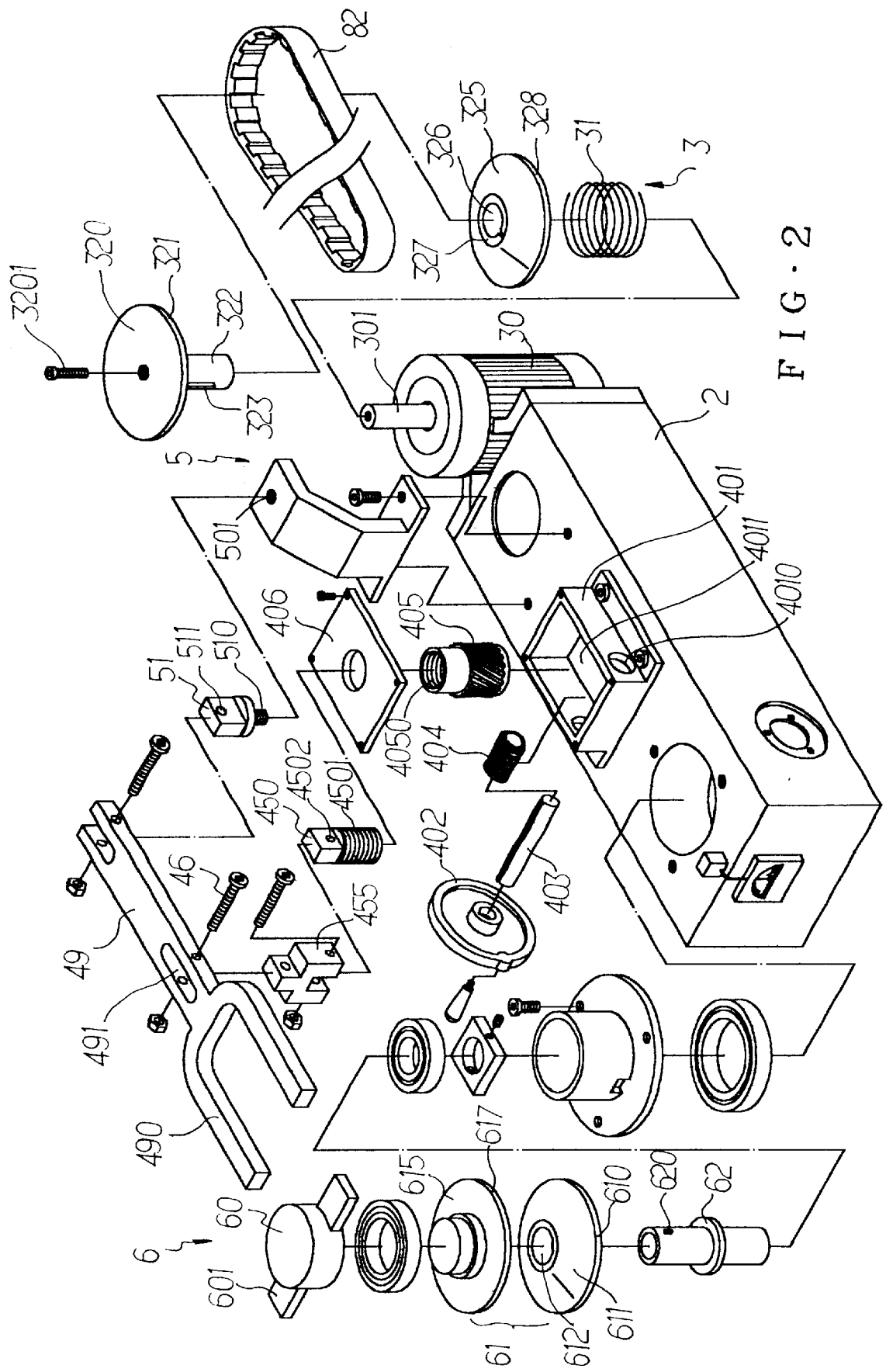
FIG. 2 is an exploded view to show a speed adjusting device of the present invention.
Figure 3:
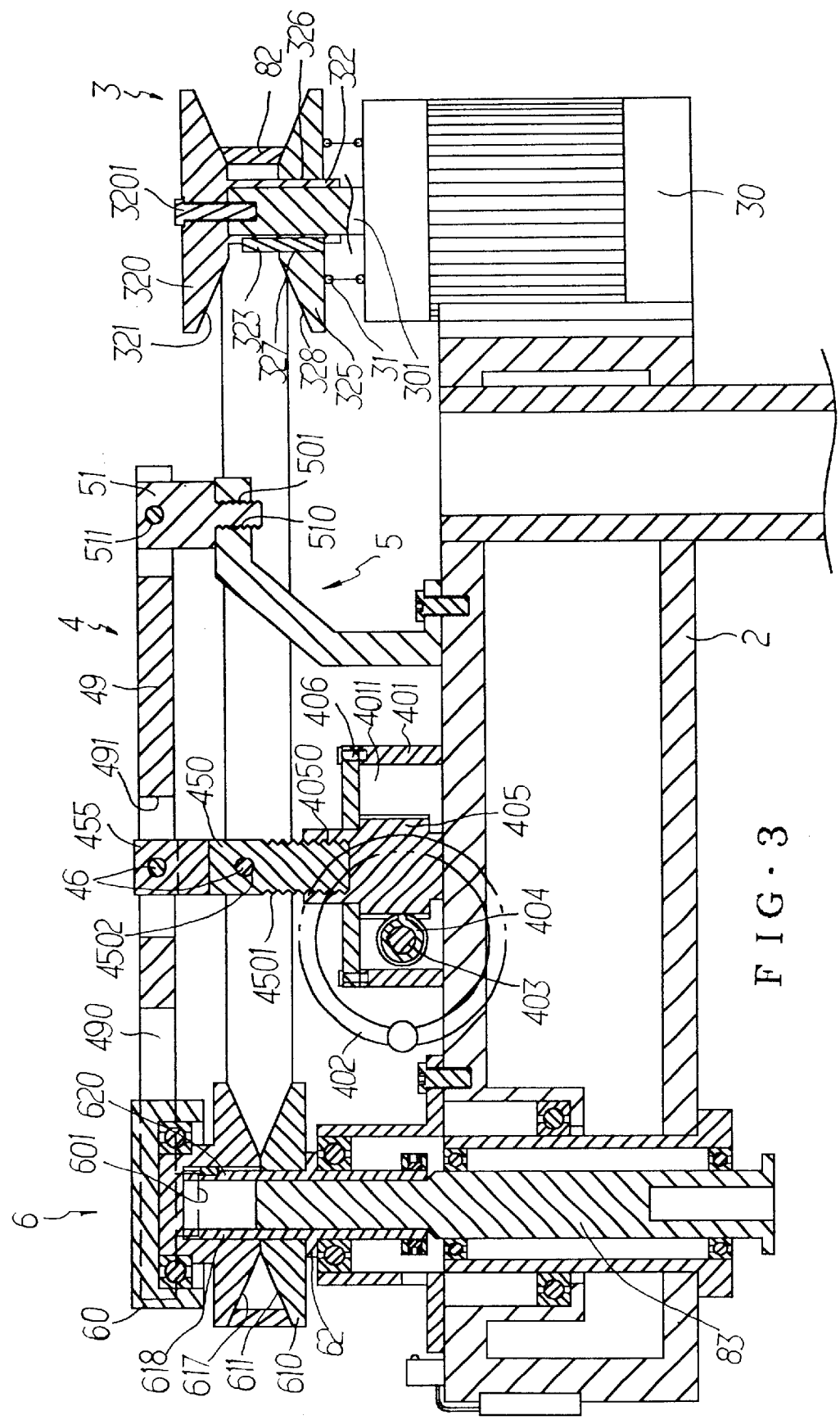
FIG. 3 is a cross sectional view to show the speed adjusting device wherein the second pulley assembly has a larger effective diameter.

Referring to FIGS. 2 and 3, the speed adjusting device in accordance with the present invention comprises a box 2 and a motor 30 connected to an end of the box 2. The motor 30 has a motor shaft 301 and a first pulley assembly 3 is mounted to the motor shaft 301. The first pulley assembly 3 comprises a first fixed disk 320 and a first movable disk 325. The first fixed disk 320 is fixedly connected to the motor shaft 301 by a bolt 3201 and has a tube 322 extending therefrom and a key 323 extends radially outward from the tube 322. The first movable disk 325 has a central hole 326 and a key way 327 is defined in an inner periphery of the central hole 326. The tube 322 is movably inserted in the central hole 326 in the first movable disk 325 and the key 323 is movably engaged with the key way 327. Each of the first fixed disk 320 and the first movable disk 325 has an inclined surface 321/328 facing each other. A spring 31 is biased between the first movable disk 325 and the motor 30.

A second pulley assembly 61 comprises a second fixed disk 610 and a second movable disk 615. The second fixed disk 610 is fixedly mounted to a driving shaft 62 and has central passage with a groove 619 defined in an inside of the groove 619 so as to receive a boss 620 extending radially outward from the driving shaft 62. The second movable disk 615 is movably mounted to the driving shaft 62. Each of second fixed disk 610 and the second movable disk 615 has an inclined surface 617/611 facing each other. An output shaft 83 extending from the box 2 is connected to the driving shaft 62 so as to connect a drill bit at the lower end of the output shaft 83. A belt 82 having V-shaped cross section is movably engaged between the first fixed disk 320 and the first movable disk 325, and between the second fixed disk 610 and the second movable disk 615.

A pressing member 49 has a fork portion on a first end thereof and the second end of the pressing member 49 has two extensions 490. A frame 5 extends from the box 2 and has a block 51 connected thereto. The block 51 has a hole 511 defined therethrough and a threaded section 510 which is connected to a threaded hole 501 in the frame 5. The block 51 is pivotally connected between two legs of the fork portion by extending a bolt through the hole 511 and the two legs of the fork portion. A cap 60 is mounted to the second movably disk 615 and has two lugs 601 extending therefrom. The two extensions 490 put on the two lugs 601.

A lifting means 45 is received in a chamber 4011 enclosed by four sides 401 and a top cover 406, and the four sides 401 are located on the box 2. The lifting means 45 has a rod 450 which is connected to a connector 455 by a bolt 46 and has a threaded outer periphery 4501. A worm gear 405 has a threaded passage 4050 defined through a center thereof and the rod 450 is movably engaged with the threaded passage 4050 by engaging the threaded outer periphery 4501 with the threaded passage 4050. A worm rod 404 is engaged with the worm gear 405 and a shaft 403 extends through two apertures 4010 in two opposite sides 401 and the worm rod 404. A wheel 402 is connected to the worm rod 404 the pressing member 49 has a slot 491 defined therethrough and the connector 455 on the rod 450 is pivotally engaged with the slot 491 by another bolt 46.

Figure 4:
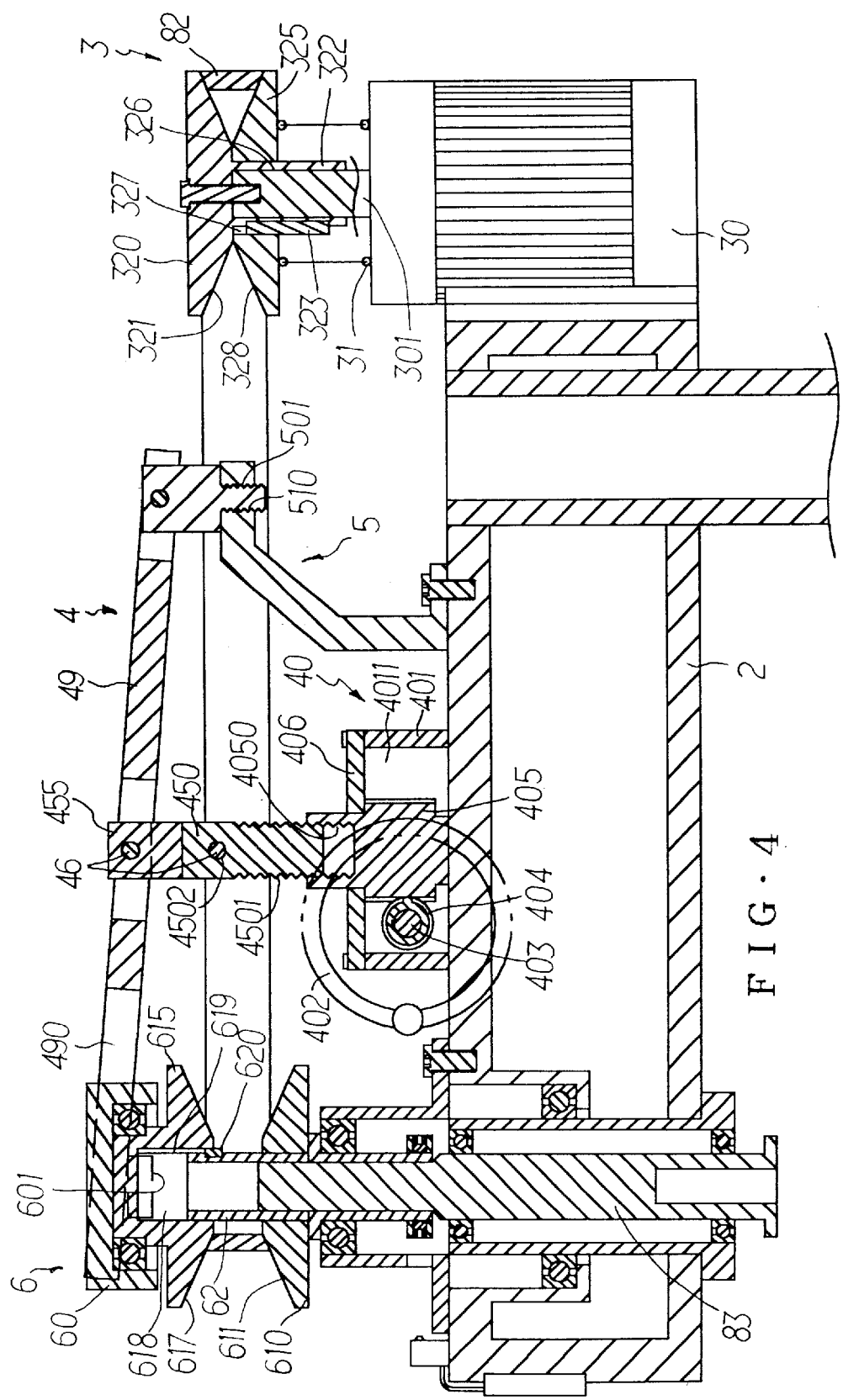
FIG. 4 is a cross sectional view to show the speed adjusting device wherein the effective diameter of the second pulley assembly is changed by rotating a wheel.

Referring to FIG. 4, when rotating the wheel 402, the rod 450 is rotated and raised upward relative to the worm gear 405. The second end of the pressing member 49 is then lifted upward and the spring 31 pushes the first movable disk 325 toward the first fixed disk 320 as shown. The belt 82 is then compressed by the inclined surfaces 321, 328 of the first fixed disk 320 and the first movable disk 325 so that an effective diameter that the belt 82 engages the first pulley assembly 3 is increased. The movement of the belt 82 reduces an effective diameter that the belt 82 engages the second pulley assembly 6 so that the speed of the output shaft 83 is increased.

While we have shown and described various embodiments in accordance with the present invention, it should be clear to those skilled in the art that further embodiments may be made without departing from the scope and spirit of the present invention.

What is claimed is:

1. A speed adjusting device for a drill, comprising:

a motor having a motor shaft and a first pulley assembly mounted to said motor shaft, said first pulley assembly comprising a first fixed disk and a first movable disk, said first fixed disk fixedly connected to said motor shaft and said first movable disk movably mounted to said motor shaft, each of said first fixed disk and said first movable disk having an inclined surface facing each other, a spring biased between said first movable disk and said motor;

a second pulley assembly comprising a second fixed disk and a second movable disk, said second fixed disk fixedly mounted to a driving shaft and said second movable disk movably mounted to said driving shaft, each of second fixed disk and said second movable disk having an inclined surface facing each other, an output shaft connected to said driving shaft, a belt movably engaged between said first fixed disk and said first movable disk, and between said second fixed disk and said second movable disk, and a pressing member having a first end which has a fork portion, a frame having a block connected thereto and said block being pivotally connected between two legs of said fork portion, a second end of said pressing member pressing on said second movable disk, a lifting means connected to said pressing member.

2. The speed adjusting device as claimed in claim 1 wherein said lifting means has a rod which is pivotally connected to said pressing member and a threaded outer periphery, a worm gear having a threaded passage defined through a center thereof and said rod movably engaged with said threaded passage, a worm rod engaged with said worm gear and a wheel connected to said worm rod.

3. The speed adjusting device as claimed in claim 1 wherein said second end of said pressing member has two extensions and a cap mounted to said second movable disk, said cap having two lugs extending therefrom and said two extensions put on said two lugs.

4. The speed adjusting device as claimed in claim 1 wherein said first fixed disk has a tube extending therefrom and a key extending radially outward from said tube, said first movable disk having a central hole and a key way defined in an inner periphery of said central hole, said tube movably inserted in said central hole in said first movable disk and said key movably engaged with said key way.

5. The speed adjusting device as claimed in claim 1 wherein said driving shaft has a boss extending radially outward therefrom and said second movable disk has central passage and a groove defined in an inside of said groove so as to receive said boss.

6. The speed adjusting device as claimed in claim 2 wherein said pressing member has a slot defined therethrough and said rod is pivotally engaged with said slot.

* * * * *